United States Patent [19]
Chiddick et al.

[11] Patent Number: 5,173,204
[45] Date of Patent: Dec. 22, 1992

[54] SOLID LUBRICANT WITH HIGH AND POSITIVE FRICTION CHARACTERISTIC

[75] Inventors: Kelvin S. Chiddick, North Vancouver; Joseph Kalousek, Vancouver, both of Canada

[73] Assignee: Century Oils (Canada), Inc., Canada

[21] Appl. No.: 769,578

[22] Filed: Oct. 2, 1991

Related U.S. Application Data

[63] Continuation of Ser. No. 492,815, Mar. 13, 1990, abandoned, which is a continuation-in-part of Ser. No. 364,453, Jun. 8, 1989, abandoned.

[51] Int. Cl.$^5$ ................ C10M 111/04; C10M 169/04
[52] U.S. Cl. ...................... 252/30; 252/25; 252/27; 252/28
[58] Field of Search ................. 252/25, 28, 27, 30

[56] References Cited

U.S. PATENT DOCUMENTS

| | | |
|---|---|---|
| 2,860,111 | 0/1958 | Rolle . |
| 3,839,208 | 1/1974 | Hermann et al. . |
| 3,935,114 | 1/1976 | Donaho, Jr. ................ 252/25 |
| 3,965,016 | 6/1976 | Soulen et al. ............... 252/25 |
| 4,329,238 | 5/1982 | Mitrofanova et al. ....... 252/26 |
| 4,473,481 | 9/1984 | Fukutsuka et al. .......... 252/30 |
| 4,557,839 | 12/1985 | Tubbs et al. ................ 252/30 |
| 4,715,972 | 12/1987 | Pacholke .................... 252/30 |
| 4,735,734 | 4/1988 | Staub et al. ................ 252/49.5 |
| 4,915,856 | 4/1990 | Jamison ..................... 252/32.7 E |

FOREIGN PATENT DOCUMENTS

| | | |
|---|---|---|
| 2703918 | of 1977 | Fed. Rep. of Germany . |
| 669207A | of 1989 | Switzerland . |
| 2207146 | of 1987 | United Kingdom . |
| 2223504 | of 1989 | United Kingdom . |

OTHER PUBLICATIONS

International Search Report.

*Primary Examiner*—Jacqueline Howard
*Attorney, Agent, or Firm*—Dority & Manning

[57] ABSTRACT

This invention pertains to a novel lubricant composition which possess high and positive friction characteristics. A high, positive friction lubricant composition comprising: (a) at least 20% by weight of a polymer media; (b) at least 5% by weight of a solid lubricant; and (c) at least 5% by weight of a powderized solid mineral friction modifier.

27 Claims, 1 Drawing Sheet

SOLID LUBRICANT WITH HIGH AND POSITIVE FRICTION CHARACTERISTIC

This is a continuation, of application Ser. No. 07/492,815, filed Mar. 13, 1990, which is a continuation-in-part application of U.S. application Ser. No. 07/364,453, filed Jun. 8, 1989, both now abandoned.

FIELD OF THE INVENTION

This invention pertains to a novel lubricant composition which possesses high and positive friction characteristics. Specifically, this invention relates to a solid or flexible-solid lubricant composition which exhibits increasing friction proportional to increasing velocity of the sliding adjacent components being lubricated.

BACKGROUND OF THE INVENTION

The art of lubrication (reduction of friction and wear) is at least as ancient as the greasing of Egyptian and Roman chariot wheel axels with tallow. During the industrial revolution, use was made of animal and vegetable oils to lubricate primitive machinery. Over the years, what was once an empirical art for minimizing solid friction and reducing wear of rubbing surfaces has evolved into a sophisticated science.

The term "lubrication" is applied to two different fact situations. "Fluid lubrication", the first situation, occurs when a thick film of a liquid or gas completely separates two solids which are in relative movement to one another. The second is known as "solid lubrication". Solid lubrication arises when a film of solids, which may be of substantial thickness, is interposed between solid surfaces which are sliding or rolling-sliding relative to one another. This invention relates to "solid film lubrication" in which the film has specific compositional and frictional properties.

The most fundamental of frictional properties is the "coefficient of friction" which is the ratio between the friction (tangential) force and the normal (vertical) force acting between bodies in relative contact. In general, the friction force is independent of the velocity of relative motion. However, there are many exceptions.

It is well known that the friction force required to initiate sliding between two bodies (static friction) is usually greater than the force required to maintain sliding between the two bodies (dynamic friction). This has given rise to the concept that there are two coefficients of friction, namely—static (for surfaces at rest) and dynamic (for surfaces in motion).

Recent investigations have shown that this basic dichotomy is a gross oversimplification and that the static friction coefficient is a function of time of contact, whereas the kinetic (dynamic) friction coefficient is a function of velocity throughout the range of velocities between the two relatively moving bodies. The change in kinetic friction coefficient is appreciable if the relative sliding velocities are extremely low or extremely high or if there is rolling-sliding contact between the bodies. When friction increases with speed, it is characterized as having a positive friction, whereas when it decreases with speed, it is known as having a negative friction characteristic. Hereinafter, the term "positive friction" means that the coefficient of friction increases with speed of sliding and a "high" coefficient of friction is greater than 0.10.

With sliding systems with negative friction characteristic, friction oscillations may arise and thus the squeaking and chattering characteristic of many sliding systems is produced. This squeaking and chattering can be eliminated by a) making the mechanical system or equipment, in which it occurs, very rigid;
b) by reducing the friction between the relatively moving components to very low levels; or
c) by changing the friction characteristic from a negative one to a positive one.

National Research Council Technical Report—WE-47, entitled "A Low Velocity Friction Machine For The Studies Of Static and Dynamic Liquid Frictions—With Special References To The Evaluation Of Slide And Way Oils", P. L. Ko and J. T. Lowe, 1985/10 25 discloses certain liquid lubricants having positive friction characteristics with coefficients of friction below 0.17.

Durafilm Materials Corporation manufactures and sells anti-wear, anti-friction lubricant under the trademark DURAFILM SPC. This lubricant is designed to reduce wheel and rail wear on heavy-haul rail roads and rapid transit systems. DURAFILM SPC is applied directly to the wheel flange to reduce friction between the wheel flange and the gage face. The product is a combination of anti-wear and anti-friction agents which are suspended in a solid polymeric carrier. Friction of the carrier against the wheel flange activates the anti-wear and antifriction agents. The DURAFILM SPC product does not display positive friction characteristics.

A lubricant insert for lubricating rolling bearings is known in the art. The insert is composed of a firm, tough, solid gel matrix containing a lubricating oil of lubricating viscosity is known in the art. The oil exudes from the matrix to provide an oily surface in contact with the elements of the bearing. The preferred form of lubricant insert comprises an annular member having a plurality of circumferentially spaced axially directed projections which have surfaces conforming to the contour of the rolling elements. The projections are of a predetermined orientation to permit ease of assembly and locking of the insert in place in the annular space between the inner and outer rings of a bearing.

In a further prior art lubricant, the lubricating composition comprises a solid lubricant homogeneously dispersed throughout a wax-polymer matrix system, suitable for lubricating railroad center plates, and a method of lubricating a railroad center plate. The lubricant composition comprising a solid lubricant selected from the group consisting of molybdenum disulphide, graphite, babbit alloy, lead, copper, red lead, zinc oxide, powdered zinc and talc, homogeneously dispersed throughout a petroleum wax-polymer system. This lubricating composition has a Coefficient of friction below 0.1 and is not positive.

Many steel rail-wheel transportation systems including freight, passenger and mass transit systems suffer from squealing or other types of high noise levels which cause a nuisance to persons dwelling close to such systems. The origin of such squealing can be traced to the negative friction characteristic between an unlubricated steel wheel and a steel rail. In any dynamic steel wheel-steel rail system, there is a constantly moving zone of contact. For purposes of discussion and analysis, it is convenient to treat the zone of contact as stationary while the rail and wheel move through the zone of contact. When the rail moves through the zone of contact at exactly the same speed and direction as the cylindrical wheel, the wheel is in an optimum state (no appreciable friction) of pure rolling over the rail. However, because the rail and the wheel are profiled, misaligned and subject to motions other than strict rolling, the respective velocities at which the rail and the wheel move through the zone of contact are not the same and sliding occurs. The magnitude and the speed of the sliding is dependent on the difference, expressed in percentage, between the rail and wheel velocities at the point of contact. This percentage difference is termed creepage.

When creepage takes place, the entire zone of contact between wheel and rail is in a state of sliding and frictional forces are generated. Since most unlubricated "steel-on-steel" surfaces exhibit a negative friction characteristic (the frictional force decreases with the speed of sliding) the rail wheel interface is excited vibrationally and thus noise, in a wide range of frequencies, is produced. Because of the nature of rail vehicles and track structure, these systems cannot be made rigid so as to eliminate the noise generated by the creepage.

Reduction of friction to very low levels, at which the friction characteristic is flat (neither positive or negative) is not practical because a flat friction characteristic would prevent vehicles from having sufficient grip for braking or accelerating.

The oscillatory motion in a rail wheel interface, in addition to raising generated noise level, produces an undulatory wave pattern on the rail or wheel surfaces. With time, under such motion, wave-like patterns are formed onto the rail and wheel surfaces. These undulations are generally referred to as corrugations of a short-pitch (5 cm, 2"). A rail with corrugations is sometimes called a "roaring rail". When this occurs, the noise levels are increased beyond those for a smooth rail wheel interface.

Usual practice to cure this problem is to remove rail corrugations by grinding or machining the rail or wheel surface. The rail or wheel are smooth for a while but with use corrugations again build up over time. In addition such grinding of rails and wheels is time consuming and expensive.

SUMMARY OF THE INVENTION

A lubricant composition with high and positive friction characteristic is an extremely attractive solution in a steel-steel sliding situation because when introduced into the rail-wheel interface at sufficient quantities, it will reduce or eliminate the noise by lubrication and, at the same time, permit the vehicle to have traction to propel, accelerate or brake. An additional benefit of such a lubricant is that the wear rate of the rail and wheel steels is reduced.

Apart from reduced friction (and noise) and wheel-rail wear, use of a high and positive friction lubricant can prevent the initiation and growth of short pitch corrugation by preventing or eliminating the oscillatory motions which are excited in the rail/wheel interface by the presence of negative friction.

Accordingly, it is an object of the present invention to provide a lubricant composition which is capable of effectively reducing short pitch corrugation. This is achieved by a lubricant composition having a high coefficient of friction and positive friction characteristics.

The invention provides a composition for use in the lubrication of steel bodies in rolling-sliding contact, the composition being solid and producing a coefficient of friction between the bodies greater than 0.10, which coefficient of friction increases with an increase in relative sliding movement between the bodies.

In a further aspect, the invention provides a solid lubricant composition comprising a solid lubricant and a friction modifier present in proportions so that the coefficient of friction produced between steel bodies in rolling-sliding motion lubricated using the composition is greater than 0.10 and wherein said coefficient of friction increases with an increase in the relative speed of sliding movement between the bodies.

Preferably the composition comprises:
(a) at least 20% by weight of a polymer medium;
(b) at least 5% by weight of a solid lubricant; and
(c) at least 5% by weight of a friction modifier so that the coefficient of friction between steel bodies in rolling-sliding contact lubricated using said composition is greater than 0.10 and increases with an increase in the relative speed of sliding movement between said bodies.

In one embodiment, the composition comprises:
(a) 20-90% by weight of a polymer medium;
(b) 5-40% by weight of a solid lubricant producing a coefficient of friction preferably of about 0.06;
(c) 5-40% by weight of powderized solid mineral friction modifier producing a coefficient of friction between steel bodies greater than 0.4;
wherein the solid lubricant and the friction modifier are present in the composition in about equal amounts, such that the resulting coefficient of friction produced by said composition is greater than 0.10 and said composition exhibits a positive friction characteristic in use.

The polymer medium can be selected from the group consisting of epoxy ester resin, polyurethane resin, polyurethane-acrylic resin, polyester resin, polyethylene resin and polypropylene resin.

The solid lubricant can be selected from the group consisting of molybdenum disulphide and graphite.

The powderized mineral friction modifier can be selected from the group consisting of powderized calcium carbonate, magnesium silicate, magnesium carbonate, bentonite, coal dust, barium sulphate, powderized asbestos, aluminum silicate, silica, amorphous silica, synthetic silica, natural silica, slate powder, diatomaceous earth, ground quartz, zinc stearate, aluminium stearate, zinc oxide, antimony oxide, dolomite, and lead carbonate, calcium sulphate, lead oxide, naphthalene synemite, and powderized polyethylene fibres.

The polymer medium may comprise at least forty percent by weight of the composition.

The solid lubricant and the friction modifier are preferably present in the composition in a 1:1 ratio ±2.5 wt. %.

The polymer medium can comprise about forty percent by weight of the composition, the solid lubricant can comprise about thirty percent by weight of the composition and the powderized friction modifier can comprise about thirty percent by weight of the composition.

The friction modifier can have a particle size in the range of about 0.5 microns to about 5 microns.

The friction modifier can have a particle size in the range of about 1 micron to about 2 microns. The friction modifier preferably produces a coefficient of a friction between steel bodies in the range of about 0.4 to about 0.8, and preferably in the range of about 0.45 to about 0.5.

The composition preferably produces a steel to steel coefficient of friction in the range of about 0.17 to about 0.32, as the relative speed of sliding increases from about 2.5% to 30%

In a specific embodiment, the invention involves a high positive friction lubricant composition comprising:
(a) about 40% by weight of a polyester resin media;
(b) about 30% by weight of molybdenum disulphide solid lubricant producing a coefficient of friction between steel bodies of about 0.06; and
(c) about 30% by weight of powderized talc (magnesium silicate) as a friction between steel bodies modifier producing a coefficient of friction from about 0.45 to about 0.5; such that the resulting coefficient of friction produced by said composition between steel bodies is greater than 0.15 and said coefficient of friction of the composition increases directly with an increase in the speed of sliding.

The polyester resin media can be orthophthalic or alternatively can be isophthalic.

The composition can contain graphite instead of molybdenum disulphide solid lubricant.

A preferred embodiment of the invention is a high and positive friction lubricant composition comprising:
(a) about 70% by weight of polyester resin media;
(b) about 14% by weight of molybdenum disulphide solid lubricant;
(c) about 14% by weight of powderized talc (magnesium silicate)
(d) about 0.3% promoters to improve and speed up the cure rate and gel time and
(e) about 1.7% initiators of polymerization such that the coefficient of friction produced between steel bodies is about 0.15 and increases directly with an increase in the speed of sliding.

The high positive friction lubricant of the invention can be exploited in controlling the traction force between the locomotive wheel set and track when the wheel set is under traction torque or dynamic braking action. This can result in better traction and braking action due to the positive friction characteristic.

The lubricant of the invention, in addition to the rail-wheel use discussed above, is suitable for use in any situation in which high friction, in the range of 0.15 to 0.35, and noiseless operation, or both, are required to eliminate slip-stick. The invention is particularly suitable for solid lubrication of traction drives (both fixed and variable-ratio).

Further, according to the present invention there is provide a method of reducing noise in a steel wheel steel rail system by applying said lubricant composition to the surface of the wheel tread or rail whereby the lubricant composition is effective to change the negative friction characteristic between the rail and the wheel to a positive friction characteristic.

DRAWINGS

In drawings which illustrate specific embodiments of the invention but which should not be construed as restricting the spirit or scope of the invention in any way:

FIG. 1 depicts graphically the friction versus creepage performance of a lubricant of the invention.

DETAILED DESCRIPTION OF THE SPECIFIC EMBODIMENTS OF THE INVENTION

Figure 1:
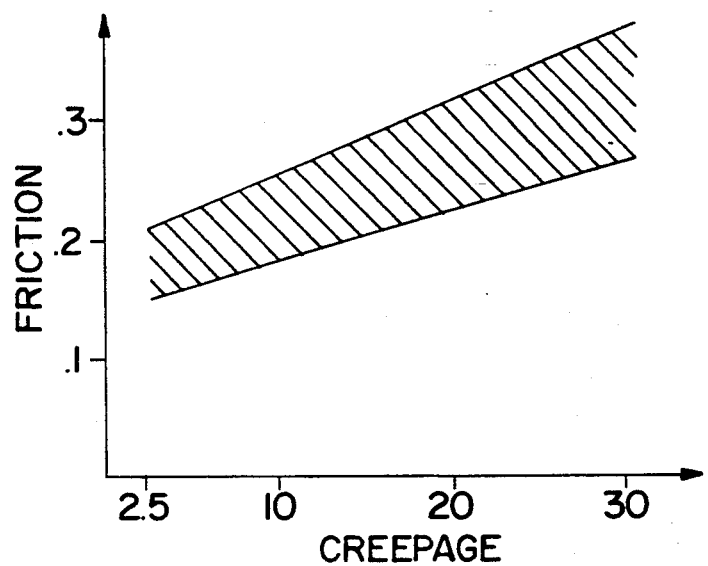

In one aspect, the invention involves a high, positive friction lubricant composition (Composition A) comprising:
(a) about 40% by weight of a polyester resin media;
(b) about 30% by weight of Molybdenum disulphide lubricant; and
(c) about 30% by weight of a talc friction modifier.

Similar high, positive friction solid lubricants according to the invention can be formulated by selecting one or more media, lubricants and friction modifiers from the following lists:

Friction Modifier (Powder):
Whiting—(Calcium Carbonate (CaCo$_3$))
Magnesium Carbonate
Talc—Magnesium Silicate MgSiO$_2$
Bentonite—(Natural Clay)
Coal Dust—(Ground Coal)
Barytes—(Barium Sulphate (BaSO$_4$))
Blanc Fixe—(Calcium Sulphate (CaSO$_4$))
Asbestos—(Asbestine derivative of asbestos)
China Clay—(Aluminum Silicate (AlSiO$_2$))
Silica—Amorphous—(Synthetic—(Si))
  Naturally occurring (Si)
  Slate powder—(Si)
  Diatomaceous Earth—(Si)
  Ground Quartz—(SiO$_2$)
Zinc Stearate—
Aluminium Stearate—
Magnesium Carbonate—MgCo$_3$
White Lead—PbO
Basic Lead Carbonate—PbCO$_3$
Zinc Oxide—ZnO$_2$
Antimony oxide—Sb$_2$O$_3$
Dolomite—MgCo$_3$CaCo$_3$
Calcium Sulphate
Naphthalene Synemite
Polyethylene Fibres Solid Lubricant
Molybdenum Disulphide—MOS$_2$
Graphite—C Media
Epoxy ester resin—(Amine cured & polyamide cured).
Two-pack Polyurethane resin—
Polyurethane-acrylic resin—
Polyester resin—(including plasticized Orthophthalic and Isophthalic resins)
Polyethylene resin—
Polypropylene resin—

In a preferred embodiment of the present invention the lubricant composition comprises about 70%, by weight of a fire retardant, brominated, isophthalic polyester resin (Dion 6604T) containing about 3% antimony trioxide, relative to the resin; about 14% by weight of molyldenum disulphide and about 14% by weight of talc.

In this preferred example other catalysts are added; for example 12% cobalt nephthenate a promoter used to speed up gel time; n,n-dimethylaniline, a promoter used to improve the cure rate and methyl ethyl ketone peroxide (50%), an organic peroxide used to initiate the polymerization reaction.

Method of Preparation

The lubricant composition of the invention is prepared according to the following method. When a two component resin system is used, the two component polyester resin is loaded into a mixing drum at room temperature. While the two component resin system is being mixed, a friction modifier such as talc is added slowly and dispersed into the resin. The molybdenum disulphide is then added slowly to the mixture and dispersed into the resin. When the components are thoroughly mixed, they are pumped through a specially designed Venus pump through a tube into a multi-shot mixing head, which has a capacity ranging from 100 milliliters to 4 liters. A catalyst is added at the mixing head. Typical catalysts are methylethylketone peroxide, and n, n-dimethylamine and cobalt naphthenate. The ratios of the two are adjusted to control the setting rate of the resin. If necessary, wax at a concentration of about 1% by weight (a 5% solution of paraffin in styrene) can be included to eliminate tackiness of the set resin. Also, about 5% acetone can be added to the mixture to reduce viscosity, if desired.

The blended mixture of resin, lubricant and friction modifier, together with catalysts and other modifiers, is transported via a mixing tube into open moulds which are on a conveyor system. When filled, the moulds are moved through a curing oven to accelerate the cure time of the product. The cured product is then dropped out of the moulds, which are inverted, and packaged for delivery to wholesalers and end users.

If thermo plastic resins are used, then usually the blended mixture of resins, lubricant and friction modifier are injection moulded at temperatures in the range of 180° C. to 200° C., at two to three atmospheric pressure, into a cured final product of any desired shape determined by the injection mould.

The friction modifier of the present invention is typically molybdenum disulphide or graphite. The particle size of the friction modifier can be in the order of 0.5 microns to 5 microns. Preferably, the particle size of the friction modifier should be about 1 micron to 2 microns. The solid lubricant of the present invention is typically molybdenum disulfide or graphite.

The friction modifier is preferably a naturally occurring mineral, but certain specific synthetic minerals of satisfactory particle size can also be used. The particle size of the friction modifier can be in the order of 0.5 microns to 5 microns. Preferably, the particle size of the friction modifier should be about 1 micron to 2 microns.

The friction modifier should have a coefficient of friction which is considerably higher than the coefficient of friction of the solid lubricant. The coefficient of friction values given are those produced between steel bodies in rolling/sliding contact. The coefficient of friction of the friction modifier can be about 0.4 to 0.8. Preferably, the coefficient of friction is about 0.45 to about 0.5. Talc having a particle size between 1 micron and 2 microns produces a coefficient of friction between steel bodies of about 0.45 to about 0.5.

The typical steel to steel coefficient of friction for molybdenum disulphide is about 0.06. The steel to steel coefficient of friction for the lubricant composition according to the invention should increase from about 0.17 to about 0.32 as creepage increases from about 2.5 to about 30%. Preferably, the coefficient of friction produced by the lubricant composition of the invention should be less than 0.3.

The desired coefficient of friction level for the lubricant composition is obtained by proportionately mixing appropriate quantities of the friction modifier with a high coefficient of friction and the solid lubricant with a very low coefficient of friction. The solid lubricant and the friction modifier are preferably present in the composition in about equal amounts but may differ from each other, up to about 5%, without affecting the friction characteristics of the composition.

EXAMPLES 1 TO 4

Combinations of the above identified products have been prepared as follows:

|  |  | Upper and Lower Range Limits Percent (%) By Weight | |
|---|---|---|---|
| 1) | Epoxy resin as base media | 90 | 30 |
|  | Talc | 5 | 35 |
|  | Molybdenum disulphide | 5 | 35 |
|  |  | 100 | 100 |
| 2) | Two-pack polyurethane resin as base media | 90 | 30 |
|  | Talc | 5 | 35 |
|  | Molybdenum disulphide | 5 | 35 |
|  |  | 100 | 100 |
| 3) | Polyurethane acrylic resin as base media | 90 | 30 |
|  | Talc | 5 | 35 |
|  | Molybdenum disulphide | 5 | 35 |
|  |  | 100 | 100 |
| 4) | Polyester resin | 90 | 30 |
|  | Talc | 5 | 35 |
|  | Molybdenum disulphide | 5 | 35 |
|  |  | 100 | 100 |

All the above combinations were also formulated replacing the molybdenum disulphide with graphite.

EXAMPLE 5

A lubricant composition (according to Composition (A)) was tested and found to have a positive friction characteristic in the range of 0.15 to 0.35, as the speed of sliding (creepage) increased from about 2.5% to about 30%. These friction levels are above friction coefficient levels associated with conventional solid, semi-solid and liquid lubricants. When applied to the surfaces of a rail or a wheel tread, composition A was found to alleviate (if not eliminate) the initiation and development of short-pitch corrugations. Noise originating from frictional oscillations in the rail-wheel interface was almost completely eliminated.

EXAMPLE 6

Properties of lubricant (Composition A)

The positive friction lubricant (Composition A) was tested for frictional properties on the Amsler wear tester (Amsler apparatus is commercially produced by a Swiss company). An Amsler wear tester is designed to test cylindrical specimens, ranging in diameter from 3 to 5 cm, for frictional and wear properties under rolling sliding conditions. By changing the diameter of the specimens and the gear ratio on the apparatus, the specimens can be subjected to a wide range of creepages.

The apparatus is also capable of measuring friction coefficient and is therefore used to evaluate the frictional properties of lubricants.

When the positive friction lubricant (Composition A) was applied to steel specimens of composition and hardness typical of the rail and wheel steels, a range of coefficients of friction were obtained. The obtained mean coefficients of friction of 0.17 and 0.32 were measured at 2.5% and 30% creepage, respectively. All other tests with this lubricant yielded a coefficient of friction within the hatched region shown in FIG. 1.

EXAMPLE 7

Composition A (40% by weight polyester resin, 30% molybdenum disulphide and 30% talc) was tested on the wheels and track of the automated Vancouver, British Columbia, Canada, subway, known as Skytrain, for over an hour on a Sunday afternoon, when temperatures were as high as 32° C., at speeds up to 110 kilometers per hour. There was no squealing or rail-wheel noise. Steel wheel rail noise and track corrugations have been a continuing problem with Skytrain since it commenced operation in 1985.

EXAMPLE 8

A lubricant composition, was prepared as described above using the following components.

|  | % By Weight |
| --- | --- |
| Dion 6604T + 3% antimony trioxide (fire retardant, brominated, Isophthalic, polyester resin) | 69.87 |
| Molybdenum disulphide | 14.08 |
| Talc 44-26 | 14.08 |
| 12% Cobalt naphihenate (promoter used to speed up gel time) | 0.25 |
| n, n-dimethylaniline (promoter used to improve the cure rate) | 0.03 |
| Methyl ethyl ketone peroxide (50%) (organic peroxide used to initiate polymerization reaction) | 0.69 |
|  | 100.00 |

The steel to steel coefficient produced by friction of this lubricant composition changes from about 0.17 to about 0.32 as the speed of sliding increases from about 2.5% to about 30%.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

We claim:

1. A solid lubricant composition comprising:
  (a) at least 20 percent by weight of a polymer medium;
  (b) at least 5 percent by weight of a solid lubricant; and
  (c) at least 5 percent by weight of a friction modifier wherein the coefficient of friction between steel bodies in rolling-sliding contact lubricated using the composition is greater than 0.10 and increases with an increase in the relative speed of sliding movement between said bodies.

2. A composition as claimed in claim 1 wherein the polymer medium is selected from the group consisting of epoxy ester resin, polyurethane resin, polyurethane-acrylic resin, polyester resin, polyethylene resin and polypropylene resin.

3. A composition as claimed in claim 1 wherein the solid lubricant is selected from the group consisting of molybdenum disulfide and graphite.

4. A composition is claimed in claim 1 wherein the friction modifier is selected form the group consisting of calcium carbonate, magnesium silicate, magnesium carbonate, bentonite, coal dust, barium sulphate, powderized asbestos, aluminum silicate, silica, amorphous silica, synthetic silica, natural silica, slate powder, diatomaceous earth, ground quartz, zinc stearate, aluminum stearate, zinc oxide, antimony oxide, dolomite, lead carbonate, calcium sulphate, lead oxide, naphthalene synemite and powderized polyethylene fibers.

5. A composition as claimed in claim 1 wherein the polymer medium comprises at least forty percent by weight of the composition.

6. A composition as claimed in claim 1 wherein the solid lubricant and the friction modifier are present in the composition in a 1:1 ratio ±2.5%.

7. A composition as claimed in claim 6 wherein the polymer medium comprises about forth percent by weight of the composition, the solid lubricant comprises about thirty percent by weight of the composition and the powderized friction modifier comprises about thirty percent by weight of the composition.

8. A composition as claimed in claim 1 wherein the friction modifier has a particle size in the range of about 0.5 microns to about 5 microns.

9. A composition as claimed in claim 1 wherein the friction modifier has a particle size in the range of about 1 micron to about 2 microns.

10. A composition as claimed in claim 1 wherein the friction modifier has a steel to steel coefficient of friction in the range of about 0.4 to about 0.8.

11. A composition as claim defined claim 1 wherein the friction modifier has a steel to steel coefficient of friction in the range of about 0.45 to about 0.5.

12. A composition as claimed in claim 1 wherein the composition has a steel to steel coefficient of friction from about 0.17 to about 0.32 as the relative speed of sliding increases from about 2.5% to about 30%.

13. A lubricant composition as claimed in claim 1 comprising:
  (a) 20-90% by weight of a polymer medium;
  (b) 5-40% by weight of a solid lubricant; and
  (c) 5-40% by weight of a powderized solid mineral friction modifier.

14. A high positive friction solid lubricant composition comprising:
  (a) about 40% by weight of a polyester resin medium;
  (b) about 30%±2.5% by weight of molybdenum disulfide solid lubricant; and
  (c) about 30%±2.5% by weight of powderized talc (magnesium silicate) such that the coefficient of friction produced by the solid lubricant composition, between steel bodies in rolling-sliding contact lubricated using the composition, is greater that 0.15 and increases with an increase in the relative speed of sliding, between said bodies.

15. A composition as claimed in claim 14 wherein the polyester resin medium is orthophthalic.

16. A composition as claimed in claim 14 wherein the polyester resin medium is isophthalic.

17. A composition as claimed in claim 14 wherein the composition contains graphite instead of molybdenum disulphide solid lubricant.

18. A high and positive friction solid lubricant composition comprising:
  (a) about 70% by weight of a polyester resin medium;
  (b) about 14% ±2.5% by weight of molybdenum disulfide solid lubricant; and
  (c) about 14%±2.5% by weight of powderized talc (magnesium silicate) such that the coefficient of friction, produced by the said composition between steel bodies in rolling-sliding contact lubricated using the composition, ranges from about 0.17 to about 0.32 as the relative speed of sliding between said bodies increases from about 2.5% to about 30%.

19. A composition as claimed in claim 17 further comprising catalysts selected from the group consisting of cobalt naphthenate, n, n-dimethylaniline and methyl ethyl ketone peroxide.

20. A composition for use in the lubrication of steel bodies in rolling-sliding contact, the composition being solid and producing a coefficient of friction between the bodies greater than 0.10 which coefficient of friction increases with increase in relative sliding movement between the bodies.

21. The method of lubricating a system, to reduce or eliminate slip-stick, comprising applying a thin film of the solid lubricant composition as defined in claim 20 to the system.

22. The method of lubricating a steel wheel-steel rail system comprising applying a thin film of the solid lubricant composition as defined in claim 20 to the wheel and rail by maintaining a solid block of the said lubricating composition in contact with the wheel.

23. A method of reducing noise in a steel wheel-steel rail system comprising applying to the surface of the wheel tread and/or the rail the solid lubricant composition of claim 20 in an amount effective to change the negative friction characteristic between the rail and the wheel to a positive friction characteristic.

24. A method of reducing wear in a steel wheel-steel rail system comprising applying to the surface of the wheel tread and/or the rail the solid lubricant composition of claim 20 in an amount effective to change the negative friction characteristic between the rail and the wheel to a positive friction characteristic.

25. The method of claim 23 wherein said lubricant composition is applied in the form of a film by maintaining a solid block of the composition in contact with said wheel.

26. The method of claim 24 wherein said lubricant compositions are applied int he form of a film by maintaining a solid block of the composition in contact with said wheel.

27. A solid lubricant composition comprising a solid lubricant and a friction modifier, present in sufficient proportions so that the coefficient of friction produced between steel bodies in rolling-sliding motion lubricated using the composition is greater than 0.10 and wherein said coefficient of friction increases with an increase in the relative speed of sliding movement between the bodies.

* * * * *